United States Patent [19]

Stephenson, III et al.

[11] Patent Number: 5,617,160
[45] Date of Patent: Apr. 1, 1997

[54] CAMERA WITH MULTI-FORMAT SELECTION

[75] Inventors: Stanley W. Stephenson, III, Spencerport; Dennis R. Zander, Penfield; Harold J. Barrett, Brockport, all of N.Y.

[73] Assignee: Eastman Kodak Company, Rochester, N.Y.

[21] Appl. No.: 388,783

[22] Filed: Feb. 15, 1995

[51] Int. Cl.⁶ .................................................. G03B 17/24
[52] U.S. Cl. ................................................................. 396/60
[58] Field of Search ...................................... 354/106, 159

[56] References Cited

U.S. PATENT DOCUMENTS

| | | | |
|---|---|---|---|
| 3,961,850 | 6/1976 | Millett | 355/77 |
| 4,183,646 | 1/1980 | Tsunefuji | 354/106 |
| 4,235,544 | 11/1980 | Yamada et al. | 354/106 |
| 4,361,388 | 11/1982 | Micak et al. | 354/106 |
| 4,493,547 | 1/1985 | Bridges | 354/106 |
| 4,928,124 | 5/1990 | Taniguchi et al. | 354/106 |
| 4,973,997 | 11/1990 | Harvey | 354/106 |
| 4,994,830 | 2/1991 | Harvey | 354/106 |
| 5,349,402 | 9/1994 | Soshi et al. | 354/106 |
| 5,389,991 | 2/1995 | Naka et al. | 354/159 |
| 5,471,266 | 11/1995 | Satou | 354/106 |
| 5,486,885 | 1/1996 | Matsumoto | 354/106 |

FOREIGN PATENT DOCUMENTS 54-26721  2/1979  Japan.

*Primary Examiner*—David M. Gray
*Attorney, Agent, or Firm*—Peter J. Bilinski

[57] ABSTRACT

A photographic camera for making pseudo photographs on film exposure areas upon opening of a camera shutter includes a light emitting diode disposed in the camera body for directly illuminating one or more positions on the film, an aperture disposed in the camera body between the light emitting diode and film for controlling illumination of the light emitting diode to provide a predetermined coded pattern of exposure on one or more positions of the film, and a lever positionable between the aperture and film to cover or uncover the aperture to regulate film exposure by the light passing through the aperture upon camera shutter opening.

18 Claims, 2 Drawing Sheets

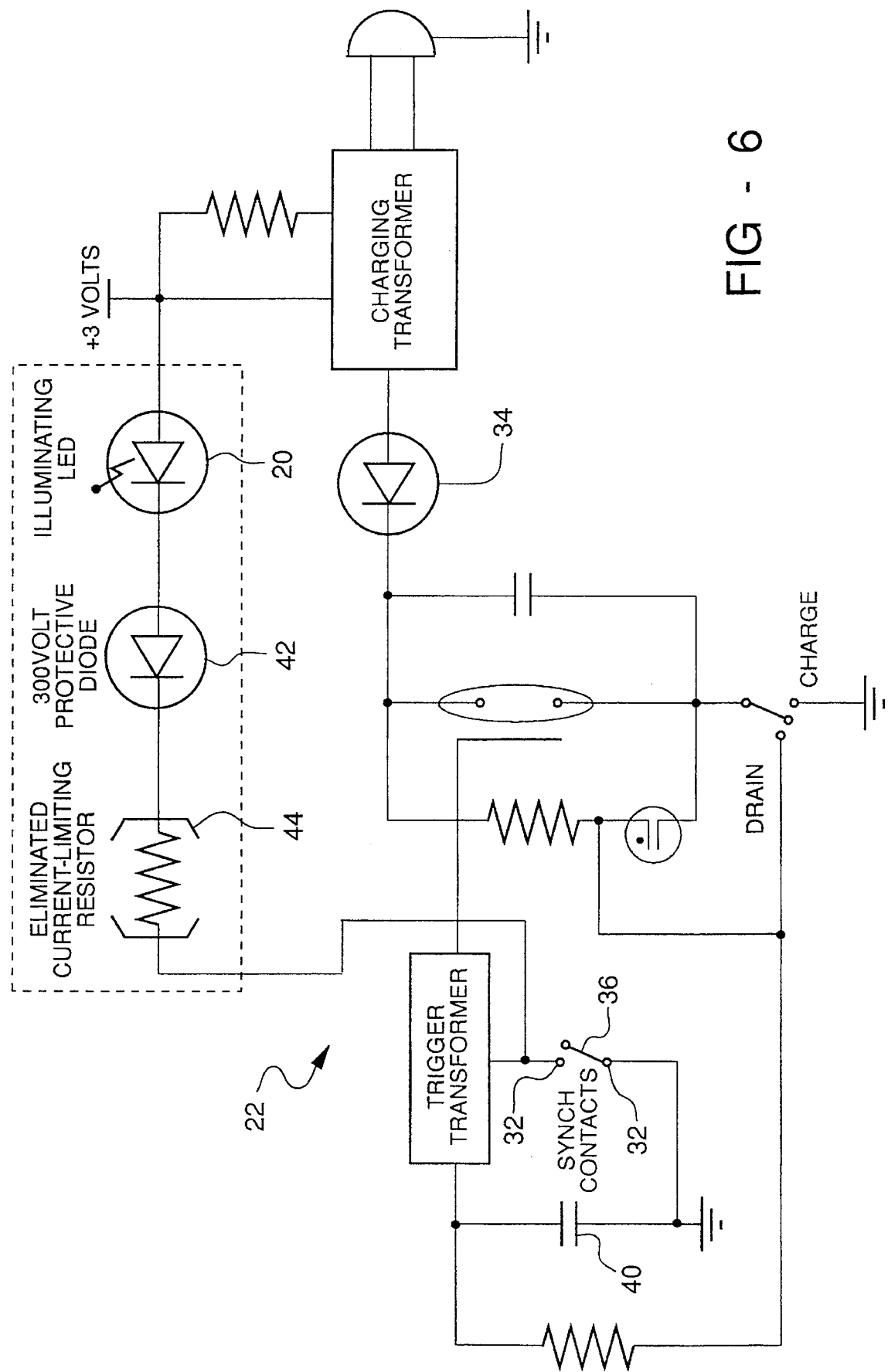

CAMERA WITH MULTI-FORMAT SELECTION

FIELD OF THE INVENTION

This invention relates to a photographic camera for enabling pseudo telephoto and/or pseudo panoramic prints to be produced and more particularly to a low-cost construction for reliable encoding of the plurality of film printing formats available with such cameras.

BACKGROUND OF THE INVENTION

Pseudo photography involves masking the viewfinder of a camera so that the user of the camera sees the particular picture which he wants printed, whether it be full frame (normal), telephoto or panoramic in nature, the latter being of course a type of pseudo wide angle photography, By suitably identifying on the film with respect to each exposure frame the particular viewfinder mask used in the exposure (encoding), the printer can determine how to mask the print or how to mask the negative when printing from the negative.

U.S. Pat. No. 4,973,997 discloses a camera that makes use of ambient light directed through light pipes to expose spots on the film to indicate normal, telephoto or panoramic print formats. Such use of ambient light can result in unreliability or underexposure under certain conditions. The present invention is directed to overcoming any limitations caused by the use of ambient light and to providing a reliable and low-cost camera construction for indicating a variety of film formats.

SUMMARY OF THE INVENTION

The present invention provides a camera having a single light emitting diode for illuminating two or more positions on the film adjacent the respective exposure frames to identify or encode film format. The invention also provides an aperture between the light emitting diode and film for controlling illumination by the diode to expose a predetermined coded pattern on one or more positions of the film. A lever positionable between the aperture and film is operable to cover or uncover the aperture to regulate film exposure by the light passing through the aperture upon camera shutter opening. Accordingly, the light emitting diode is illuminated at every film exposure regardless of the state of an electronic flash to provide a reliable, uniform exposure of the film. The very short duration of time during which the diode is activated, generally 100 microseconds, allows the diode to be overpowered to increase illumination levels.

These and other features and advantages of the invention will be more fully understood from the following detailed description of the invention taken together with the accompanying drawings,

BRIEF DESCRIPTION OF THE DRAWINGS

In the drawings:

FIG. 6 is a schematic view of an electronic flash circuit including the light emitting diode of the invention.

DETAILED DESCRIPTION OF THE INVENTION

Figure 1:
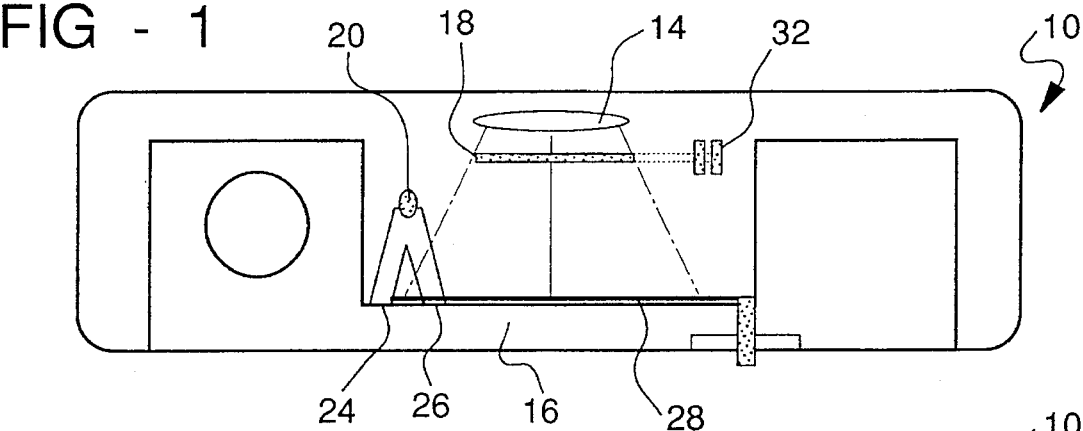
FIG. 1 is a diagrammatic plan view of a camera constructed in accordance with the present invention.
Figure 2:
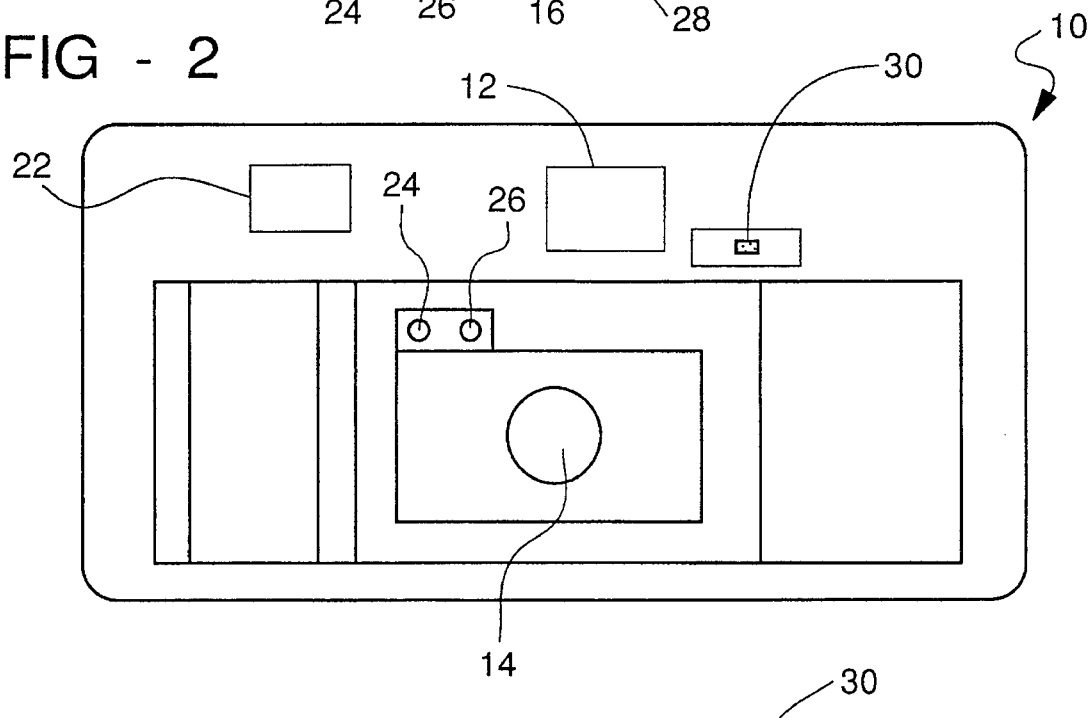
FIG. 2 is a diagrammatic elevational view of the camera of FIG. 1.

Referring now to the drawings in detail, numeral 10 generally indicates a camera body including a viewfinder 12, a taking lens 14, a film passageway 16, and a shutter blade 18.

A light emitting diode 20 mounted in camera body 10 provides a light source for reliably exposing one or more positions on a film in the camera body. It is preferable to provide two or more exposed positions. As herein described, the light emitting diode 20 is part of an electronic flash circuit 22. The light emitting diode 20 is positioned so that its irradiating cone provides significant illumination across all the indicating positions. The diode 20 is caused to be illuminated upon camera shutter blade 18 opening as hereinafter described.

The camera body 10 includes a pair of apertures 24, 26 located between the light emitting diode 20 and film passageway 16. Apertures 24, 26 direct light from the light emitting diode 20 onto the film to expose selected areas of the film. Such exposure is used to encode the film to indicate printing formats as described in U.S. Pat. No. 4,973,997.

A lever 28 is slidably mounted in camera body 10. Lever 28 includes a format switch 30 positionable by the camera operator to a plurality of positions to move the lever to cover or uncover apertures 24, 26 to indicate or encode the printing format on the film. When the camera is operated, the light emitting diode 20 is illuminated at every film exposure using the flash synchronizing contacts 32. A diode 34 is disposed in the circuit 22 to energize the light emitting diode 20 regardless of electronic flash actuation. The encoding or film exposure by the illumination from the light emitting diode 20 is thusly regulated by lever 28. In another embodiment of the invention, lever 28 may be in communication with a positionable viewfinder mask as is known.

Figure 3:
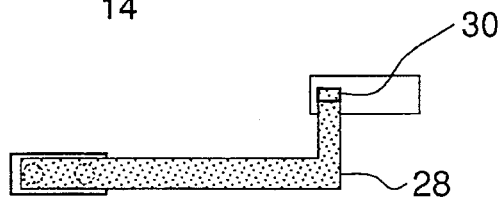
FIGS. 3–5 show various positions of a lever for covering or uncovering apertures for indicating printing format, FIG. 3 showing the position for full frame (normal) encoding in which both apertures are blocked, FIG. 4 showing a position for pseudo telephoto encoding in which one aperture is blocked, and FIG. 5 showing the position for a panoramic encoding in which neither aperture is blocked.

FIG. 3 shows the lever 28 at its extreme left hand position such that both apertures 24, 26 are blocked when the light emitting diode 20 is illuminated. In this case no light reaches a portion of the film.

Figure 4:
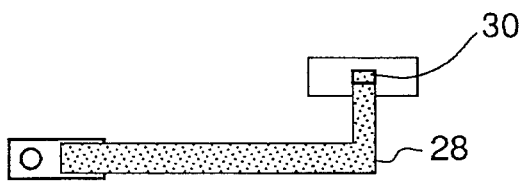

In FIG. 4, lever 28 is positioned for pseudo telephoto exposure and one aperture 26 is covered such that when the light emitting diode is illuminated, light is permitted to reach a portion of the film through aperture 24 but not through aperture 26.

Figure 5:
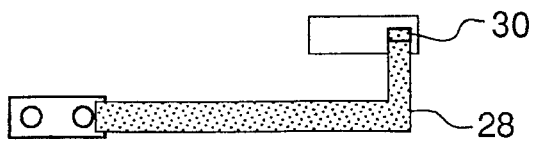

In FIG. 5, lever 28 is positioned at a far right hand position for taking a pseudo panoramic picture. In this position, the illuminated light emitting diode 20 is able to expose the film through both apertures 24, 26.

In the preferred embodiment, the light emitting diode 20 is actuated by the flash synchronization contacts 32. In low-cost cameras, the shutter blade 18 normally covers the lens 14. When a picture is taken, the shutter blade 18 is forcibly driven to an open position, then sprung back into the closed position. The synchronizing switch 36 is closed for the 100 microseconds it takes for the shutter blade 18 to come to a stop and begin returning to the shutter closed position.

Closure of the synchronizing switch 36 typically switches the trigger capacitor 40 to ground. This ground-switching action is used to switch the powered light emitting diode 20 to ground. The light emitting diode 20 turns on during the period the synchronizing switch 36 is closed. It was predicted that a IN4004 diode 42, capable of resisting 400 volts, was needed in series with the light emitting diode 20 to prevent the 300+ volts from the trigger capacitor 40 from surging through the light emitting diode 20 if the flash was on. A resistor 44 is typically placed in series with the light emitting diode 20 to control the current through the light emitting diode 20. This configuration allows the light emitting diode 20 to fire for 100 microseconds at full aperture whether the flash circuit 22 is charged or off.

An experimental camera was built to evaluate the concept. It was found that the combination of short on-time use of the light emitting diode 20 (100 microseconds) and the distance between the film and the light emitting diode resulted in insufficient exposure of the film. Low-cost light emitting diodes are designed to pass a maximum of 20 milliamps of current based on continuous operation. This resistor 44 could be 100 ohms. Through experiments, it was determined these light emitting diodes can pass 20 times the maximum specified design when the ON times were for 100 microseconds. The diodes will not burn out during the typical 5,000 actuations for the life of the camera. Therefore, the current limiting resistance of the experimental apparatus was reduced to pass the increased current, resulting in adequate exposure of the format indicating areas. Such overpowering of the light emitting diode 20 allows for the use of low-cost components in this camera 10.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | |
|---|---|
| 10. | camera body |
| 12. | viewfinder |
| 14. | lens |
| 16. | film passageway |
| 18. | shutter blade |
| 20. | light emitting diode |
| 22. | flash circuit |
| 24. | aperture |
| 26. | aperture |
| 28. | lever |
| 30. | switch |
| 32. | synchronizing contacts |
| 34. | diode |
| 36. | synchronizing switch |
| 40. | trigger capacitor |
| 42. | IN4004 diode |
| 44. | resistor |

What is claimed is:

1. A photographic camera for making pseudo photographs on film exposure areas upon opening of camera shutter means, said camera including a camera body and also including a format indicating means for selecting from a range of pseudo fields of view for exposures, the camera characterized by:

a light emitting diode disposed in said camera body for directly illuminating one or more positions on the film;

an aperture disposed in said camera body between said light emitting diode and film for controlling illumination by said light emitting diode to provide a predetermined coded pattern of exposure on said one or more positions of the film;

a lever positionable between said aperture and film to cover or uncover said aperture to regulate film exposure by the light passing through said aperture upon camera shutter opening; and an electronic flash circuit for actuating said light emitting diode upon full shutter opening, said electronic flash circuit having flash synchronizing contacts, said flash synchronizing contacts being used to pulse said light emitting diode whether or not the flash is activated; said electronic flash circuit powering said light emitting diode at a current level beyond continuous use operating limits of said diode to improve illumination of said film.

2. The invention of claim 1 characterized in that said light emitting diode (20) is powered to twenty times said operating limits.

3. The invention of claim 2 characterized in that said light emitting diode (20) is powered generally for 100 microseconds.

4. The invention of claim 1 characterized in that said light emitting diode (20) is powered generally for 100 microseconds.

5. A photographic camera for making pseudo photographs on exposure areas of a filmstrip comprising:

a camera body;

format indicating means for selecting from a range of pseudo fields of views for exposures; and film shutter means openable to allow pseudo photographs to be taken;

a light emitting diode disposed in said camera body for directly illuminating one or more positions on the filmstrip;

at least two apertures disposed in said camera body between said light emitting diode and said filmstrip for controlling illumination of said light emitting diode and to provide a predetermined coded pattern of exposure on one or more positions of the film;

a lever positionable between said at least two apertures and said filmstrip to cover and uncover said at least two apertures to provide the predetermined coded pattern of exposure on said filmstrip and thereby regulate film exposure by the illumination passing through said at least two apertures upon opening of said film shutter means; and an electronic flash circuit for actuating said light emitting diode upon full shutter opening, said electronic flash circuit having flash synchronizing contacts, said flash synchronizing contacts being used to pulse said light emitting diode whether or not the flash is activated; said electronic flash circuit powering said light emitting diode at a current level beyond continuous use operating limits of said diode to improve illumination of said film.

6. The invention of claim 5, wherein said camera body includes two apertures in which said lever can selectively close both apertures, one of said apertures, and neither of said apertures to provide the predetermined coded pattern on the filmstrip from illumination from said light emitting diode.

7. The invention of claim 6 characterized in that said light emitting diode is powered to twenty times said operating limits.

8. The invention of claim 7 characterized in that said light emitting diode is powered generally for 100 microseconds.

9. The invention of claim 5 characterized in that said light emitting diode is powered to twenty times said operating limits.

10. The invention of claim 9 characterized in that said light emitting diode is powered generally for 100 microseconds.

11. The invention of claim 5 characterized in that said light emitting diode is powered generally for 100 microseconds.

12. A photographic camera for making pseudo photographs on film exposure areas, said camera comprising:

a camera body;

a camera shutter disposed in said camera body;

a format indicator for selecting from a range of pseudo fields of view for exposures;

a light emitting diode disposed in said camera body for directly illuminating one or more positions on the film responsive to said format indicator; and an electronic flash circuit actuating said light emitting diode upon opening of said camera shutter, said electronic flash circuit having a flash and means for selectively actuating said flash upon opening of said camera shutter, said electronic flash circuit powering said light emitting diode at a current level beyond continuous use operating limits of said light emitting diode.

13. The camera of claim 12 wherein said electronic flash circuit includes, in series, a protective diode and then said light emitting diode.

14. The invention of claim 13 wherein said light emitting diode is powered to twenty times said operating limits.

15. The invention of claim 14 characterized in that said light emitting diode is powered generally for 100 microseconds.

16. The invention of claim 12 wherein said light emitting diode is powered to twenty times said operating limits.

17. The invention of claim 16 characterized in that said light emitting diode is powered generally for 100 microseconds.

18. The invention of claim 12 characterized in that said light emitting diode is powered generally for 100 microseconds.

* * * * *